United States Patent [19]
Boyce et al.

[11] 3,973,706
[45] Aug. 10, 1976

[54] CONNECTION FROM WATCHBAND-CARRIED BATTERY TO ELECTRONIC WATCH

[75] Inventors: Edward J. Boyce, Smithtown Pines; Harvey Bidner, Plainview, both of N.Y.

[73] Assignee: Jacoby-Bender, Inc., Woodside, N.Y.

[22] Filed: Dec. 30, 1974

[21] Appl. No.: 537,171

[52] U.S. Cl. ............................... 224/4 D; 224/4 E; 58/23 BA
[51] Int. Cl.² ..................... G04B 37/12; G04C 3/00
[58] Field of Search............ 58/23 R, 23 BA, 152 R, 58/152 B, 50 R, 57.5; 224/4 D, 28 W, 4 F, 4 E

[56] References Cited
UNITED STATES PATENTS

| | | | |
|---|---|---|---|
| 2,189,096 | 2/1940 | Alonge | 224/4 F |
| 3,018,614 | 1/1962 | Brien | 58/23 BA X |
| 3,681,587 | 8/1972 | Brien | 58/50 R X |
| 3,788,059 | 1/1974 | Spadini | 58/57.5 X |

FOREIGN PATENTS OR APPLICATIONS

| | | | |
|---|---|---|---|
| 880,121 | 10/1961 | United Kingdom | 58/23 BA |

OTHER PUBLICATIONS

Sanders, "Flexprint Wiring Handbook of Design Information", Sanders Associates, Inc., Nashua, N.H., 1958, pp. 1 and 14.

*Primary Examiner*—Ulysses Weldon

[57] ABSTRACT

An electronic watch with watchband-carried batteries in which an electrical conductor completes the circuit from battery to watch. A standard, removably fastened watch part is used to securely fasten the conductor to the watch case. In one embodiment an electrical connector is inserted through a passage in the watch case and is firmly seated between the spring bar and a corresponding connector attached inside the watch case. In the other embodiment the conductor fits in a passage between the watch case and back cover while the back cover presses an angled connector into firm engagement with the internal connector. A battery compartment, the conductor and the connector are joined in a molded case for added durability and reliability as well as ease of replacement.

44 Claims, 6 Drawing Figures

CONNECTION FROM WATCHBAND-CARRIED BATTERY TO ELECTRONIC WATCH

The present invention is directed to an arrangement for utilizing a standard, removably fastened watch part to securely retain in place an electrical conductor attached to an electronic watch to supply it with power from a watchband-carried battery.

Electronic wrist watches require electrical energy from batteries to operate for any extended length of time. It is well known to carry these batteries either internally or externally of the watch case. In the former arrangement the battery is sealed inside the watch case thereby protecting it, and the rather simple electrical connections needed, from moisture, dust, dirt and foreign objects. However, the size of the watch case must be considerably increased to accommodate the batteries. Such a bulky case is not aesthetically pleasing, especially for ladies' watches. Also, the extra metal required makes the case heavier and more expensive. Furthermore, replacement of internal batteries requires a skilled watch repairman since the back cover must be removed thereby exposing the sensitive watch components. Putting the batteries outside the watch case, on the other hand, allows a thinner, lighter, less expensive, and more aesthetically pleasing watch, especially with the recently developed electronic display watches which require no moving parts and can therefore be made quite thin and delicate. However, such an arrangement has its own problems because the batteries and a length of electrical conductor, needed to complete the circuit from battery to watch, are exposed to the rigors of wear outside the watch case and because a hole must be made in the watch case to receive the conductor. Some of the factors that must be taken into consideration in designing a satisfactory assembly are as follows:

1. Exposure of the battery to moisture,
2. Exposure of the electrical conductor and connections to corrosive effects of perspiration,
3. Necessity for a certain degree of flexibility in the watchband,
4. Exposure of the electrical conductor to cutting, snagging and wear,
5. Retention of waterproof feature despite the need for a hole in the watch case,
6. A strong, durable and reliable connection between the conductor and the watch case,
7. Low cost, and
8. Convenient and economical installation and replacement.

The basic difficulty is in providing protection for the conductor as it extends from battery to watch as well as providing a strong connection between conductor and watch without excessive expense and with easy replacement of the parts. None of the prior art arrangements for carrying batteries externally of the watch case has satisfied these requirements. A crude attachment made simply by putting the conductor through a hole in the side of the case, although relatively inexpensive, is inadequate to provide a durable connection since it is relatively easy to pull out and exposes the conductor to being snagged, torn or cut. An increase in the reliability and the durability of the connection has been attained only in exchange for a significant increase in cost. For example, one scheme to expose the conductor as little as possible involves drilling holes through the lugs and into the case and running the conductor through these holes. Besides the expense of drilling these holes, the replacement of a torn conductor is time consuming and costly. Other such schemes involve expensive alterations to the watch case and/or use of special and therefore more expensive batteries and parts.

It is a general object of the present invention to provide an aesthetically pleasing electronic wristwatch having its batteries carried by the watchband.

It is a more specific object of the present invention to provide a durable, reliable, strong and relatively inexpensive connection from the batteries to the watch case.

It is another object of the present invention to use a standard, removably fastenable watch part to securely attach the conductor to the watch.

It is a further object of the present invention to provide a battery holder, electrical conductor and electrical connector which are, along with the battery, conveniently, quickly and inexpensively replaceable.

In accordance with these objects, the present invention is provided with a battery compartment, electrical conductor, and electrical connector preferably joined in a molded case for added strength and simple assembly and replacement. The battery compartment is carried by the watchband while the connector fits into a passage in the watch case and engages a corresponding internal plug. One embodiment provides a hole in the side of the watch case adapted to receive a connector. A protruding ring on the connector fits into a groove on the periphery of the hole to firmly secure the connector in place. To add rigidity and strength to the attachment, the plug is firmly seated between the spring bar and internal connector. Replacement requires little more than removal of the spring bar. The second embodiment is provided with a passage in the watch case recessed from the battery cover. The internal connector is attached adjacent this recess. With the back cover off, the conductor is placed in the recess while an angled portion of the connector is positioned in contact with the internal connector so that replacement of the back cover firmly presses the two connectors into engagement. Inadvertent removal of the conductor is prevented by the angled portion and a protrusion on the connector which engages the inside of the watch case around the periphery of the recess. Only removal of the back cover is required to expose the connector for a simple and quick replacement.

To the accomplishment of the above, and to such other objects as may hereinafter appear, the present invention relates to the construction of an electronic watch having its batteries carried by the watchband, as defined in the appended claims and as described in this specification, taken together with the accompanying drawings, in which:

An electrical conductor is required to connect a battery carried by a watchband to the circuitry mounted within the case of an electronic watch. To keep costs down this connection is made through a passage in the relatively thin side of the watch case. Such an arrangement exposes the conductor for much of its length but eliminates the expensive drilling otherwise required to run the conductor through the lugs and into the watch case. Exposure of the conductor being thus unavoidable, a strong, durable and reliable circuit connection can still be attained by reinforcing the conductor at its weak points. One weak point is the physical connection of the conductor into the watch case. If this connection is not secure any snagging of the conductor or failure of the spring bar will tend to pull the conductor out of the case and stop the watch. The exposed portion of the conductor is another weak point since it can be torn by sharp objects and because its conductive properties are subject to abuse from wear as well as the corrosive effects of perspiration from the wearer's wrist. This invention is therefore primarily directed to an arrangement for strengthening these weak points in an economical manner while simultaneously providing an arrangement for quick and easy installation and replacement of the batteries and-/or conductor.

To broadly describe the main parts of the watch assembly, conductor A is connected to watch B by a set of electrical connectors C. Conductor A serves to complete the circuit from a battery in watchband G to watch B. To retain connectors C in engagement yet allow for easy access to permit quick installation and replacement a part D is used which is removably fastened to watch B. As conductor A is placed in a passage F made in watch B, part D firmly presses the connectors together yet is easily removable when necessary in order to separate the connectors C. To strengthen conductor A and eliminate areas exposed to corrosion, that conductor is made a part of a case E which defines the battery compartment in one integral unit, and it also carries the set of connectors C. Such a case E is durable, relatively low in cost when produced in volume, and simplifies installation and replacement.

Figure 2:
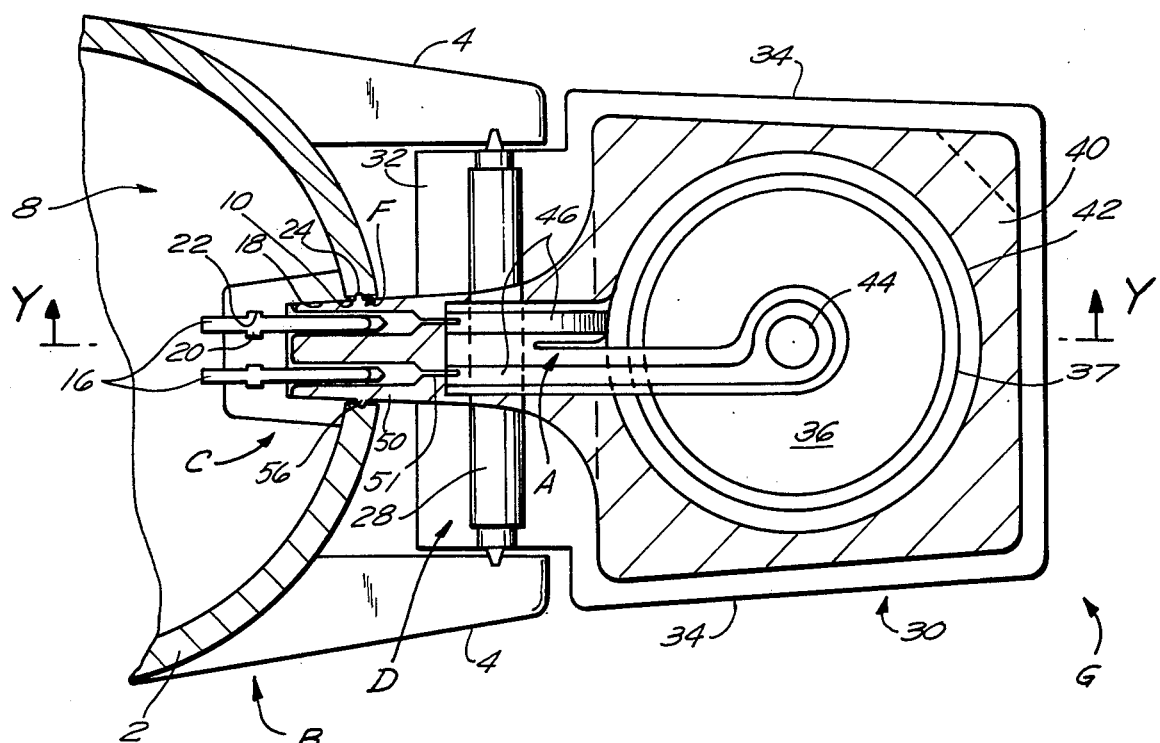
FIG. 2 is a top sectional view of the invention taken along lines X—X of FIG. 3.
Figure 3:
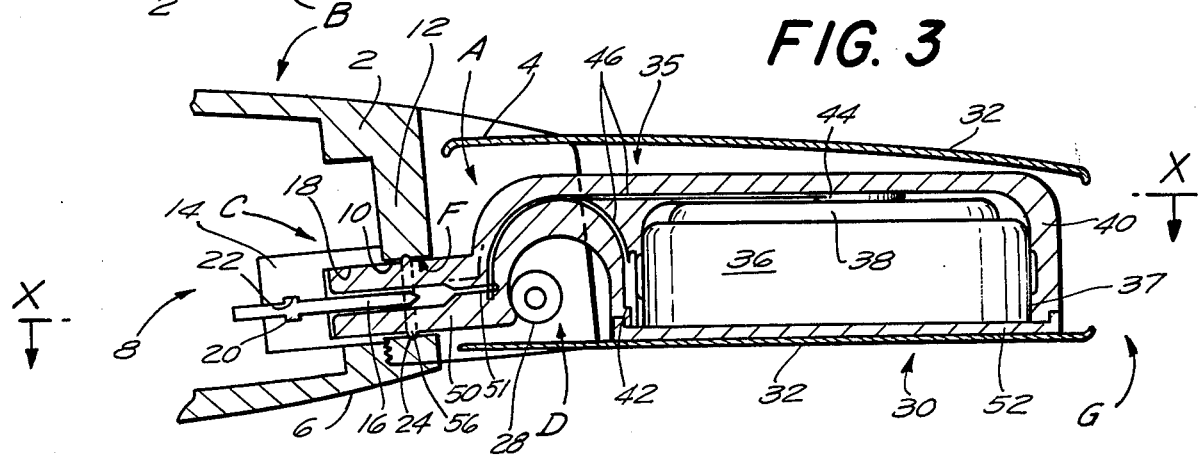
FIG. 3 is a front sectional view of the invention taken along lines Y—Y of FIG. 2.

Turning now to a more specific description of the first embodiment, watch B is shown in FIGS. 2 and 3 to be comprised of a case 2 and lugs 4. Case 2 contains many components necessary for the proper operation of watch B but all those not necessary to the description of the invention are omitted in order to simplify the drawings. A back cover 6 is tightened to case 2 to form a cavity 8 designed to accommodate the electronic time measuring instrument (not shown). Back cover 6 has a threaded portion which screws into case 2 to form a tight and protective seal. A hole 10 is made in side 12 of case 2 between lugs 4. The hole is placed toward the bottom of case 2 near back cover 6 so as to leave room for the time indicating device (not shown) in the upper part of the case. However, the exactness of this position is not critical so long as it is between the lugs 4. A groove 24 is formed in wall 12 around the periphery of hole 10. One of the electrical connectors C is securely attached to the side 12 of case 2 around the periphery of hole 10. This connector C is comprised of a pin block 14 and metal pins 16 which are attached to block 14 and have one end protruding into a cavity 18 of block 14. Pins 16 are connected at their other end to the electrical circuitry of the watch (not shown). The pins 16 are kept from sliding in block 14 by a protruding ring 20 which fits securely into groove 22 in block 14. Cavity 18 of block 14 and hole 10 of watch case 2 form a passage leading to pins 16. The passage is tightly sealed and watertight on all sides by virtue of the attachment of block 14 to case wall 12.

Watchband G is comprised of a plurality of links of which link 30 is the closest to watch B and is the only one shown. As best seen in FIG. 3, link 30 is comprised of top and bottom pieces 32 and sides 34 which enclose a hollow space 35. Link 30 is adapted to be secured to lugs 4 by a spring bar 28 in a conventional manner, that spring bar 28 constituting the previously mentioned part D. Pieces 32 are elongated to extend into the area between lugs 4 to thereby cover the area surrounding spring bar 28 for reasons to be discussed below. Pieces 32 are not long enough to touch case 2 because watchband G must retain a certain freedom of movement around spring bar 28 for the convenience and comfort of the wearer. Precise dimensions depend on the style of watch and watchband but the important point involved is protection of the area around the spring bar.

Space 35 in link 30 must be large enough to accommodate a conventional electronic watch battery 36 generally available on the market. Battery 36 has one terminal 37 around its periphery and the other terminal 38 on top. Use of a readily available battery keeps usage costs down and makes finding a replacement more convenient, thus increasing the attractiveness of such a watch for a prospective buyer. Since an electronic watch battery is relatively small such a requirement places no great or insurmountable limitations on the size and attractiveness of watchbands. One of pieces 32, preferably the one resting on the wrist, is made hingable in order to admit battery 36 inside link 30. Watchband G does not have to be made of a plurality of links. Many different types of bands can be used as long as they contain a hollow space large enough to accommodate battery 36 and have a portion protecting the area around spring bar 28.

Figure 1:
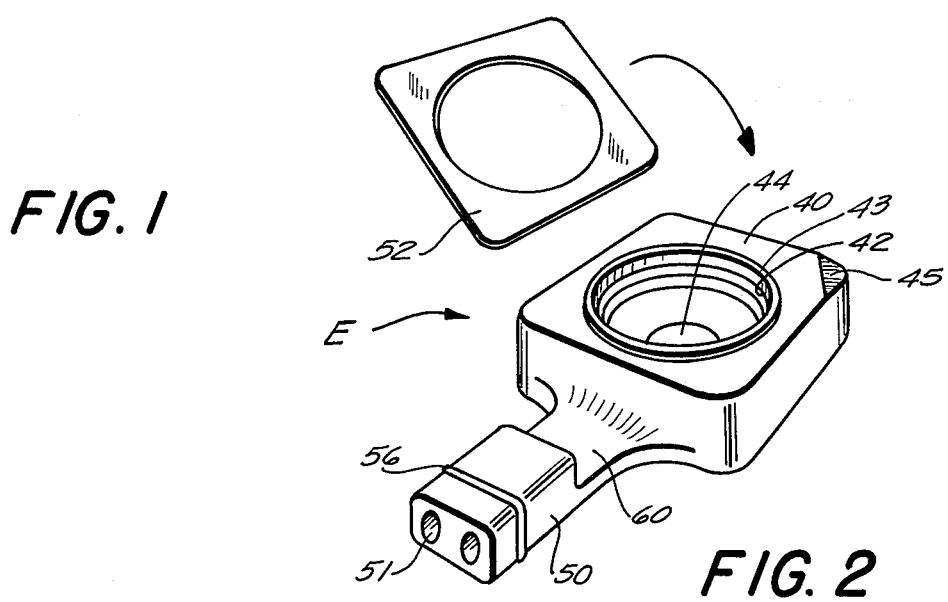
FIG. 1 is a perspective view of the molded battery case.

A battery compartment 40 is made small enough to fit within link 30 and yet large enough to accommodate battery 36. As best seen in FIG. 1, a contact ring 42 and a contact 44 are attached inside compartment 40 and engage terminals 37 and 38 of battery 36, respectively. Compartment 40 must, of course, be made of an electrical insulating material and should be sealed to keep moisture away from the battery, and dust, dirt and perspiration away from the contacts. A cover is press-fit to protruding ring 43 of contact ring 42 to provide this seal. Battery 36 is pressed up against contact 44 by cover 52 (See FIG. 3). A beveled corner edge 45 on compartment 40 is provided to facilitate removal of cover 52. Compartment 40 and the sealing mechanism can be made in many ways including molding battery 36 within a closed case to provide the best type of seal for longer battery life in exchange for the relatively slight addtional cost of the attached compartment 40. Insertion of compartment 40 into link 30 can be done in many well known ways, such as hinging one of pieces 32, as discussed above, but since this does not form a significant part of the invention no additional details are believed necessary.

Contacts 42 and 44 are connected to conductor A. This connection can be made permanent, such as by soldering, or detachable, such as by using connecting terminals. Conductor A is comprised of leads 46 which serve to connect terminals 42 and 44 of battery compartment 40 to a block 50 comprising the other connector C. Since leads 46 must extend from link 30 to watch case 2, they are subjected to movement as link 30 rotates around spring bar 28. Such movement is necessary to allow adjustability of the watch band to a particular wrist size. However, since spring bar 28 is in the path of movement of leads 46, flexibility of the band would be impeded unless the leads have some slack. The problem with providing this slack is that too much of it would expose more of the leads to accidental snagging, cutting or tearing on protruding objects whereas too little slack would cause possible discomfort to the wearer or a tearing of the leads and/or separation of connectors C under the strain imposed on the watch band by the wearer's efforts to forcibly adjust the band. As best shown in FIG. 3, the necessary slack is provided by placing leads 46 over spring bar 28 and then completing the connection to watch case 2. When the watchband is flat, leads 46 will extend slightly away from bar 28 while as link 30 rotates downward leads 46 will approach bar 28. Just enough slack should be provided to keep leads 46 from being stretched over spring bar 28. Leads 46 must, therefore, be such as to provide a flexible conductor that is strong and durable and yet is thin enough, even with some slack in it, to fit in the confined space between link 30 and case 2.

Top and bottom pieces 32 of link 30 preferably extend over leads 46 for protection against any objects that may intrude into the area around spring bar 28 and damage the leads. Though the entire exposed lead length cannot be protected in this manner since link 30 must be slightly separated from case 2 to allow watchband flexibility, at least the portion around spring bar 28, which by virtue of the slack in it is most vulnerable, is covered for protection. However, sharp objects can still enter the area between watch case 2 and link 30, especially when the watch is off the wearer's wrist and placed among other objects. Such objects may grasp or become entangled with leads 46 and cause separation of connectors C even if no damage results to the leads. Block 50 attached to conductor A is structured to combine with the removably fastened part D (pin 28) to prevent such an inadvertant separation of connectors C.

The connector C attached to conductor A is comprised of a block 50 containing sockets 51. Sockets 51 can be attached to leads 46 in any one of several well known ways, as discussed above, and are adapted to receive the pins 16 of the other connector C to complete the circuit from battery 36, contact 42, conductor 46, a socket 51, corresponding pin 16, electronic circuit (not shown), the other pin 16, its corresponding socket 51, conductor 46, contact 44 back to the battery. Block 50 fits within hole 10 in watch case 2 and as it is fully inserted into cavity 18 of block 14 pin 16 slides into socket 51 to complete the above circuit. A portion of block 50 extends outside case 2 and engages spring bar 28. Spring bar 28 functions as the removably fastened watch part D to retain connectors C in engagement. After the spring bar is inserted in place, block 50 is snugly and firmly seated between it and block 14. Block 50 cannot be pulled out of hole 10 because spring bar 28 blocks the path. Block 50 is made rigid enough so it cannot be bent up-and-over spring bar 28 and cause separation of connectors C in this manner. Thus, as long as spring bar 28 is in its proper position, it retains connectors C in firm engagement. Despite the strength and reliability of such an arrangement, insertion and removal of block 50 is quite simple. All that is needed is removal of spring bar 28. Once this is done link 30 can be moved out of the way to expose block 50. Insertion or removal of block 50 is then done quickly and easily without exposing any of the internal watch parts to moisture, dirt or dust. This operation can be done anywhere quickly and easily by anyone who knows how to remove a spring bar.

Since block 50 depends on spring bar 28 for its secure attachment to case 2, the watch is vulnerable to a malfunction should the spring bar fail. Although such an occurrence is infrequent, occasionally the spring bar is not seated properly into lugs 4 and gives under strain. Also, it, like any other mechanical part, can break. With prior art electronic watches with watchband-contained batteries this often meant a torn lead or a broken connection to the watch case with resultant expensive repairs. In the invention, with support of the spring bar no longer behind block 50 it is free to either move enough to separate from pin 16 and break the circuit or to completely fall out of hole 10. To prevent such an occurrence connector 50 is equipped with a protruding ring 56 adapted to fit into groove 24 around hole 10. Ring 56 can be compressed under pressure as connector 50 is forcibly pushed into hole 10 but it will keep connector 50 in place for all except considerable forces tending to pull it out of place. Consequently, accurate time keeping can be relied upon even when the spring bar fails.

Leads 46 must be connected to battery compartment 40 and to socket 51 in block 50 in order to complete the circuit to the watch. Should each of these parts be manufactured as a separate unit a type of connection would be needed to electrically connect and physically attach them together. The electrical connection must be readily fastenable or repair costs would be unacceptably high. It must also be protected from the harmful effects of dirt and dust as well as a corrosion from perspiration. The physical attachment must be strong to resist the rigors of wear discussed above yet such as to permit easy separation of the parts when replacement is needed. Joining these parts in one integral unit, such as a molded case, on the other hand, eliminates the need for such strong, carefully protected yet easily unfastenable connections because the case will absorb the rigors of wear and the electrical connections can be made even delicate. The case also serves to seal out moisture, dirt and dust. Though it is generally true that each part costs less than all three combined and should one malfunction the other two need not be replaced, this is outweighed by the labor saved in assembling and replacing the parts. A unit is simply put in as is or replaced as is while the separate parts must be unfastened, removed and reconnected. Also, less parts are used in a single unit construction because the connectors for interconnecting the parts are eliminated. Furthermore, the molding processes of today can produce a good quality product for a relatively low price when manufactured in volume. Consequently, the peculiar requirements of the invention seem to dictate the use of an integral unit for parts 40, 46 and 50.

Case E is shown in FIG. 1 to be comprised of those parts for which a single unit construction has been found above to be advisable. Battery compartment 40 is attached to plug 50 by a flexible portion 60 containing the leads 46. A molded plastic is used for its strong, durable and flexible characteristics. Each one of its parts is constructed precisely as described before, the only difference being that all are permanently and integrally joined. Flexible portion 60 is thin enough to be flexible yet thick enough to resist tearing or cutting while the junctures between battery compartment 40 and portion 60 and between block 50 and portion 60 are strong enough to resist separation.

In order to make portion 60 as thin and flexible as possible, for the reasons discussed above, a flexible printed circuit is preferably used for leads 46. It is well suited to the molding process and to the flexibility and size requirements of portion 60. Its relatively delicate construction is no hindrance because it is well insulated and protected within case E.

Figure 4:
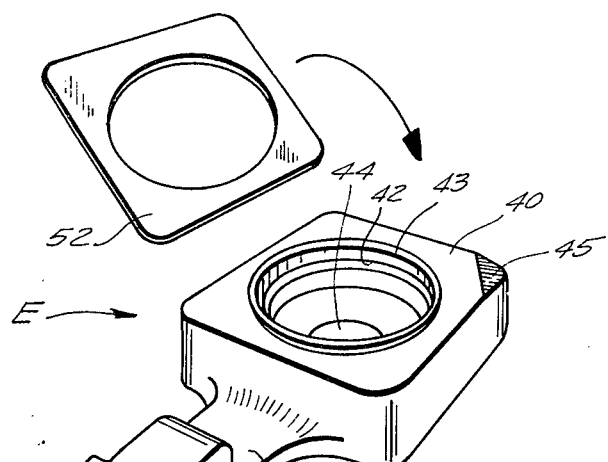
FIG. 4 is a perspective view of a second embodiment of the molded battery case.
Figure 5:
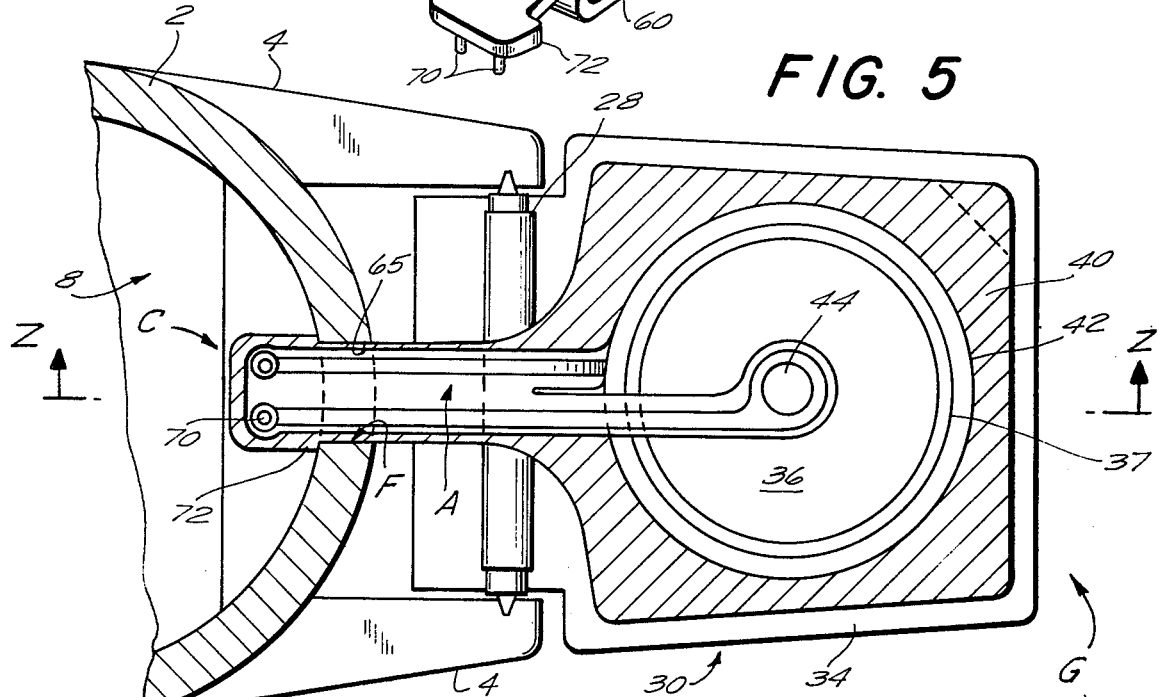
FIG. 5 is a top section view of the invention taken along lines W—W of FIG. 6.
Figure 6:
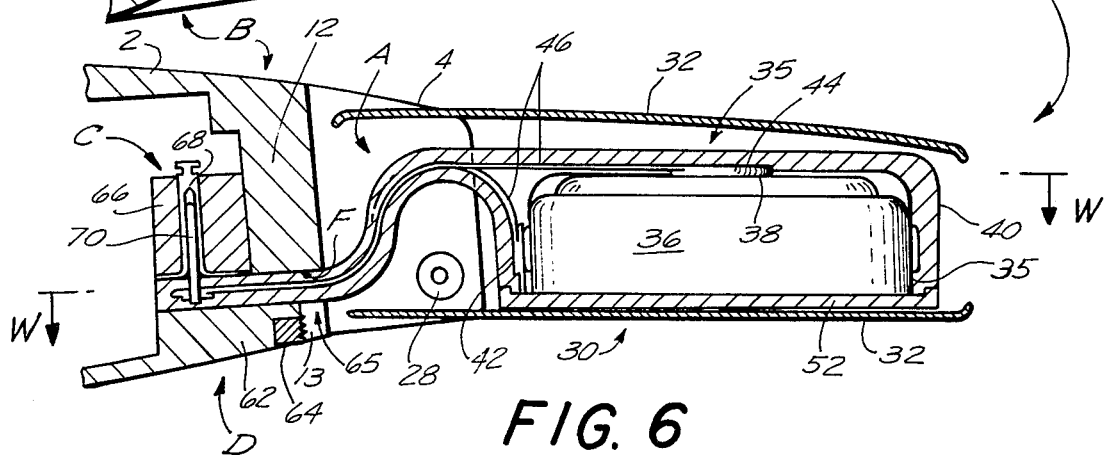
FIG. 6 is a front sectional view of the invention taken along lines Z—Z in FIG. 5.

The second embodiment, for which like parts are numbered exactly as in FIGS. 1–3 for the first embodiment, is shown in FIGS. 4–6. Watch B is comprised of a watch case 2 and lugs 4. Notch 65 in case 2 is bounded by portions 13 of wall 12. A back cover 62 is fastened to watch case 2 by a threaded retaining ring 64 which threads onto portions 13 of wall 12. The notch 65 is deep enough so that case 2 is recessed from back cover 62 to form passage F between wall 12 and back cover 62 to the interior 8 of the watch.

One of connectors C is a block 66 containing a socket 68. Block 66 is securely fastened inside watch B to wall 12. The axis of socket 68 is substantially parallel to wall 12 and substantially perpendicular to back cover 62. Block 66 is fastened just above recess 65 so that passage F now extends to the area between block 66 and back cover 62.

Watchband G can be of the same type as used in the first embodiment and contains the same link 30 fastened to watch case 2 by the same spring bar 28. Battery compartment 40 and its associated contacts as well as leads 46 are identical to those used in the first embodiment but here the similarities end.

As best shown in FIG. 6, a pin 70 is attached to leads 46 near the end of conductor A. Pin 70 is adapted to fit into socket 68 while recess 65 is large enough to receive the conductor A.

Cover 62 must be removed from case 2 in order to engage connectors C. With the back cover removed conductor A is placed within recess 65 and pin 70 is pushed into passage 68. As back cover 62 is fastened to case 2 by retaining ring 64 it presses against conductor A and pushes pin 70 into socket 68. Pin 70 is thus firmly secured between block 66 and the back cover 62 which functions as removably fastened watch part D in this embodiment. Removal of pin 70 is not possible except if it is sheared off. Pin 70 is made strong enough to resist such a shearing force. To provide a watertight enclosure back cover 62 presses conductor A between it and the wall 12. This seal can be tightened by proper adjustment of retaining ring 64.

Though the second embodiment requires a removal of the back cover, exposure of the internal watch parts is minimized by the insignificant time needed to insert pin 70 and reclose back cover 62. Furthermore, this embodiment provides a strong connection between connectors C which is totally independent of the spring bar 28. Even if spring bar 28 fails, the connection is strong enough to easily retain connectors C in engagement. Conductor A cannot be pulled out because of the angle between pin 70 and passage F and because there is insufficient room in passage F to accommodate pin 70 even if it should bend out of shape. Preferably conductor A also has a protruding portion 72 engaging the inside of the watch case 2 at the periphery of recess 65 to preclude withdrawal of the conductor A from the watch case 2 when the back cover 62 is in place. Thus, in exchange for the necessity to remove back cover 62 a very strong and reliable circuit connection is attained. Furthermore, since mere removal of back cover 62 exposes connectors C, installation and replacement is simple and quick.

The discussion for the first embodiment concerning the necessary slack of flexible portion 60 and the preference for a single unit construction including parts 40, 46 and 50 applies here as well to parts 40, 46 and 70.

It should be noted that conductor A in both embodiments is adjacent the back cover. Rotation is needed to thread the back cover to case 2 and such movement could damage the plastic of Case E by wearing it away or cutting through it. Each embodiment is protected against this possibility. For the first embodiment, as best seen in FIG. 3, connector 50 of conductor A is separated from back cover 6 by pin block 14 which completely surrounds hole 10. Thus, as back cover 6 is threaded into case 2 it abuts against the durable pin block 14 and never contacts connector 50. For the second embodiment, as best seen in FIG. 6, rotation of the back cover 62 is unnecessary since it is fastened to watch case 2 by a retaining ring 64 and the retaining ring is separated from conductor A by a portion of the back cover.

It will be apparent from the foregoing that the advantages of the present invention are achieved by utilizing passages in the watch case which are inexpensive to manufacture and by relying on a removably fastened part of the watch to perform its usual function as well as retaining the electrical connectors in engagement.

The description of the invention as applied to an electronic watch is merely illustrative and is not meant to limit the scope of the invention. Indeed such electric powered devices as watches, minicalculators, radios or any combination of these as well as any other small, battery-powered device which can be worn on the wrist with a watch type band may be utilized instead of the aforedescribed electronic watch.

While but two specific embodiments of the present invention have been here specifically disclosed, it will be apparent that many variations may be made therein, all within the scope of the instant invention as defined in the following claims.

We claim:
1. A wrist assembly comprising:
a case adapted to receive within a small battery-powered device and having a passage communicating between the inside and outside of said case;
a wristband secured to said case;
at least one battery compartment carried by said wristband;
an electrical conductor operatively connected to said at least one battery compartment;
a first electrical connector attached inside said case adjacent said passage and adapted to be operatively connected to said device;
an assembly part removably fastened to said case in proximity to said first connector and said passage; and
a second connector operatively connected to said electrical conductor and received in said passage in engagement with said first connector, said second connector fitting relatively snugly between said first connector and said assembly part, whereby said assembly part assists in retaining said connectors in engagement.

2. The assembly of claim 1, wherein said first and second connectors are male-female connectors, respectively.

3. The assembly of claim 1, wherein said assembly part extends laterally of said wristband and is spaced from said passage.

4. The assembly of claim 3, wherein said assembly part is a spring bar attaching said wristband to said case.

5. The assembly of claim 3, wherein said passage is a hole communicating with said first connector, said first connector facing said assembly part and said hole and being axially aligned with said hole.

6. The assembly of claim 5, wherein said first connector is attached around the periphery of said hole in a watertight fit.

7. The assembly of claim 5, further comprising a protruding ring on said second connector and a groove in said case around said hole, said ring being fitted within said groove.

8. The assembly of claim 1, wherein at least a part of said second connector is at an angle to said conductor and wherein said assembly part is a back cover for said case, the angled part of said second connector being secured between said first connector and said back cover.

9. The assembly of claim 8, wherein said second and first connectors are male-female connectors, respectively, the axes of said connectors being substantially perpendicular to said back cover.

10. The assembly of claim 8, wherein said case is recessed from said assembly part at a location adjacent said first connector, said conductor fitting in said recess.

11. The assembly of claim 10 wherein the fit of said conductor in said recess is watertight.

12. The assembly of claim 10, wherein said second connector has a protruding portion engaging the inside of said case at the periphery of said recess.

13. The assembly of claim 1, wherein said battery, said conductor and said second connector are attached in one integral unit.

14. The assembly of claim 13, wherein said unit is a molded plastic case having a battery compartment on one end and said second connector on the other end joined by said flexible portion containing said conductor.

15. The assembly of claim 13, wherein said conductor is a flexible printed circuit.

16. In a wrist assembly comprising:
a case adapted to receive within a small batterypowered device, a wristband secured to said case, there being an element extending laterally of said wristband attached to said case, at least one battery compartment carried by said wristband, and an electrical conductor operatively extending from said at least one battery compartment, the improvement comprising:
a first electrical connector attached inside said case facing and in proximity to said element and operatively connected to said device;
a second electrical connector operatively connected to said electrical conductor; and
said case having a hole communicating with said first connector facing but spaced from said element, said second connector being inserted in said hole and engaging said first connector, said second connector fitting relatively snugly between said first connector and said element, whereby said element serves to assist in retaining said connectors in engagement.

17. The assembly of claim 16, wherein said element is a spring bar attaching said wristband to said case.

18. The assembly of claim 16, wherein said case has a groove around the periphery of said hole, said second connector having a protruding ring fitting in said groove.

19. The assembly of claim 16, wherein said battery, said conductor and said second connector are attached in one integral unit.

20. The assembly of claim 19, wherein said unit is a molded plastic case having said battery compartment on one end and said second connector on the other end joined by a flexible portion containing said conductor.

21. The assembly of claim 19, wherein said conductor is a flexible printed circuit.

22. The assembly of claim 16, wherein said first and second connectors are male-female connectors, respectively.

23. In a wrist assembly comprising:
a case adapted to receive within a small battery-powered device, a back cover for said case, a wristband secured to said case, at least one battery compartment carried by said wristband, and an electrical conductor operatively extending from said battery compartment, the improvement comprising:
a first electrical connector operatively connected to said device and attached inside said case; and a second electrical connector operatively connected to said conductor, at least a part of said second connector being at an angle to said conductor;
said case being recessed from said back cover at a spot adjacent said first connector;
said first connector fitting in said recess, said second connector engaging said first connector with said angled part of said second connector being secured between said back cover and said first connector, whereby said back cover serves to assist in retaining said connectors in engagement.

24. The assembly of claim 23, wherein said second and first connectors are male-female connectors, respectively, the axes of said connectors being substantially perpendicular to said back cover.

25. The assembly of claim 23, wherein the conductor is fluid-tightly secured within said recess between said back cover and said case.

26. The assembly of claim 23, wherein said battery, said conductor, and said second connector are attached in one integral unit.

27. The assembly of claim 26, wherein said unit is a molded plastic case having said battery compartment on one end and said second connector on the other end joined by a flexible portion containing said conductor.

28. The assembly of claim 27, wherein said conductor is a flexible printed circuit.

29. The assembly of claim 23, wherein said conductor has a protruding portion engaging the inside of said case at the periphery of said recess.

30. A battery holder adapted to fit into a wristband for a small battery-powered device comprising:
a case defining a compartment adapted to receive at least one battery, said compartment having electrical contacts exposed therein adapted to engage the terminals of the battery;
a rigid electrical connector adapted to fit into a small battery-powered device;

an electrical conductor operatively connecting both said contacts to said connector; and said conductor being integral with said case, said case carrying said connector and being flexible around said conductor.

31. The battery holder of claim 30, wherein said case is made of molded plastic.

32. The battery holder of claim 30, wherein said conductor is a flexible printed circuit.

33. The assembly of claim 2, wherein the axes of said connectors are substantially aligned with the axis of said passage.

34. The assembly of claim 1, wherein said second conductor traverses said assembly part.

35. The assembly of claim 1, wherein said first and second connectors are engagable and disengagable without opening of said case.

36. The assembly of claim 1, wherein said second connector has an enlarged portion releasably engaged by an interior portion of said case, whereby said enlarged portion assists in retaining said connectors in engagement in the absence of said assembly part.

37. The assembly of claim 1, wherein said assembly part is spaced from the interior of said case.

38. The assembly of claim 16, wherein the axes of said connectors are substantially aligned with the axis of said hole.

39. The assembly of claim 16, wherein said second conductor traverses said element.

40. The assembly of claim 16, wherein said first and second connectors are engageable and disengageable without opening of said case.

41. The assembly of claim 16, wherein said second connector has an enlarged portion releasably engaged by an interior portion of said case, whereby said enlarged portion assists in retaining said connector in engagement in the absence of said element.

42. The assembly of claim 16, wherein said element is spaced from the interior of said case.

43. A wrist assembly comprising:

a case adapted to receive within a small battery-powered device and having a passage communicating between the inside and outside of said case and a groove around said passage;

a wristband secured to said case;

at least one battery compartment carried by said wristband;

an electrical conductor operatively connected to said at least one battery compartment;

a first electrical connector attached inside said case adjacent said passage and adapted to be operatively connected to said device;

an assembly part removably fastened to said case in proximity to said first connector and said passage; and a second connector operatively connected to said electrical conductor and received in said passage in engagement with said first connector, said second connector having a projecting ring fitted within said case groove, said second connector fitting relatively snugly between said first connector and said assembly part, whereby said assembly part assists in retaining said connectors in engagement.

44. In a wrist assembly comprising:

a case adapted to receive within a small battery-powered device, a wristband secured to said case, there being an element extending laterally of said wristband attached to said case, at least one battery compartment carried by said wristband, and an electrical conductor operatively extending from said at least one battery compartment, the improvement comprising:

a first electrical connector attached inside said case facing and in proximity to said element and operatively connected to said device;

a second electrical connector operatively connected to said electrical conductor and having a projecting ring; and said case having a hole communicating with said first connector facing but spaced from said element and a groove around said hole, said second connector being inserted in said hole and engaging said first connector with said second connector projecting ring fitting within said case groove, said second connector fitting relatively snugly between said first connector and said element, whereby said element serves to assist in retaining said connectors in engagement.

* * * * *